(12) United States Patent
Buonanno et al.

(10) Patent No.: US 7,343,406 B1
(45) Date of Patent: Mar. 11, 2008

(54) PROACTIVE CALL AND CONTACT CENTER SYSTEM

(75) Inventors: Mark Buonanno, Sunnyvale, CA (US); Michael Swailes, Pleasanton, CA (US); Stephen R. Quatrano, Lexington, MA (US); Jean Seo, Union City, CA (US); Chris Shenefiel, Oakton, VA (US)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 09/766,175

(22) Filed: Jan. 18, 2001

(51) Int. Cl.
*G06F 15/173* (2006.01)
*G06F 11/00* (2006.01)
*G06Q 99/00* (2006.01)

(52) U.S. Cl. .............................. 709/224; 705/1; 714/48
(58) Field of Classification Search .................... 705/1, 705/7, 8, 9, 10, 11, 26, 400, 500; 709/224, 709/223, 238, 205, 204, 203; 714/48; 707/10, 707/104.1
See application file for complete search history.

(56) References Cited

U.S. PATENT DOCUMENTS

| | | | | |
|---|---|---|---|---|
| 4,554,418 | A | | 11/1985 | Toy |
| 4,899,375 | A | * | 2/1990 | Bauer et al. ................. 379/264 |
| 5,043,983 | A | * | 8/1991 | Dorst et al. .............. 370/110.1 |
| 5,287,505 | A | * | 2/1994 | Calvert et al. ................. 707/10 |
| 5,414,754 | A | * | 5/1995 | Pugh et al. ............... 379/88.23 |
| 5,822,410 | A | * | 10/1998 | McCausland et al. .. 379/114.01 |
| 5,983,198 | A | * | 11/1999 | Mowery et al. .............. 705/22 |
| 6,012,045 | A | * | 1/2000 | Barzilai et al. ................ 705/37 |
| 6,029,140 | A | * | 2/2000 | Martin et al. .................. 705/11 |
| 6,032,184 | A | * | 2/2000 | Cogger et al. .................. 705/8 |
| 6,182,277 | B1 | * | 1/2001 | DeGroot et al. ............. 717/115 |
| 6,289,333 | B1 | | 9/2001 | Jawahar et al. |
| 6,438,599 | B1 | | 8/2002 | Chack |
| 6,530,518 | B1 | * | 3/2003 | Krichilsky et al. .......... 235/375 |
| 6,606,744 | B1 | * | 8/2003 | Mikurak ...................... 717/174 |
| 6,957,186 | B1 | * | 10/2005 | Guheen et al. ................. 705/1 |
| 2001/0032263 | A1 | | 10/2001 | Gopal et al. |
| 2001/0044840 | A1 | | 11/2001 | Carleton |

(Continued)

FOREIGN PATENT DOCUMENTS

WO  99/03053  1/1999

(Continued)

OTHER PUBLICATIONS

Look Smart; Find Articles: AT&T, MCI to Release New Management Tools; Jan. 1994; 3 pages.*

*Primary Examiner*—Igor N. Borissov
(74) *Attorney, Agent, or Firm*—Marger Johnson & McCollom, P.C.

(57) ABSTRACT

A proactive call center which detects problems, resolves the problems, and then contacts the customers before customers initiate calls themselves. In the present invention, the workflow process is monitored to ensure that a transaction is completed without problems. If a problem occurs, a call center agent is notified of the problem. The call center agent can then take immediate steps to research the problem, fix the problem, or otherwise find alternative solutions to help ameliorate the problem. The call center agent then contacts the customer to explain the problem and what steps were taken to address the problem. By proactively taking steps to address problems as they occur rather than in response to customer complaints, businesses can maintain goodwill.

24 Claims, 5 Drawing Sheets

U.S. PATENT DOCUMENTS

| | | |
|---|---|---|
| 2001/0051878 A1 | 12/2001 | Yong |
| 2002/0049622 A1 | 4/2002 | Lettich et al. |
| 2002/0059131 A1* | 5/2002 | Goodwin et al. ............ 705/37 |
| 2002/0071440 A1 | 6/2002 | Cerami et al. |
| 2002/0072992 A1 | 6/2002 | Elms et al. |
| 2002/0073355 A1* | 6/2002 | Cerami et al. ............... 714/4 |
| 2002/0078017 A1* | 6/2002 | Cerami et al. ............... 707/1 |
| 2002/0087680 A1* | 7/2002 | Cerami et al. ............. 709/224 |
| 2002/0138320 A1* | 9/2002 | Robertson et al. ............ 705/8 |
| 2002/0169626 A1 | 11/2002 | Walker et al. |
| 2002/0188530 A1* | 12/2002 | Wojcik et al. ............... 705/28 |
| 2002/0194272 A1 | 12/2002 | Zhu |
| 2003/0177071 A1 | 9/2003 | Treese et al. |
| 2004/0049562 A1 | 3/2004 | Kikinis |

FOREIGN PATENT DOCUMENTS

| | | | |
|---|---|---|---|
| WO | WO99/03053 | * | 1/1999 |

* cited by examiner

PROACTIVE CALL AND CONTACT CENTER SYSTEM

FIELD OF THE INVENTION

The present invention relates to a proactive call and contact center system.

BACKGROUND OF THE INVENTION

On-line business transactions are growing at a phenomenal rate. A wide range of products and services are now being offered for sale to consumers by businesses over the Internet. These business-to-consumer (B2C) companies have web sites where consumers can browse, order, and pay for products (e.g., books, CDs, toys, clothes, etc.) and services (e.g., electronic banking, stock trading, etc.), all of which are conducted electronically via the Internet. Furthermore, exchanges for facilitating business-to-business (B2B) transactions are becoming quite popular. The primary attraction and allure of conducting business on-line lies in its potential for enabling a large number of highly automated transactions to be conducted on a regular basis with multiple customers and/or trading partners at low cost. Ideally, the on-line model attempts to eliminate any form of human interaction in order to reduce costs while, at the same time, increasing the speed and efficiency of executing those transactions.

Unfortunately, however, on-line business transactions are error-prone. Human mistakes, software bugs, network/transmission failures, etc. can cause a transaction to fail. The downside is that on-line transactions, by their very nature, cannot be guaranteed to have been successfully completed. There will always be some small percentage of business transactions which will fail.

Failures can severely degrade the reputation and goodwill of these B2C and B2B companies. For B2C businesses struggling to establish a web presence and build an on-line brand, failures can seriously jeopardize their operations. Irate consumers can readily shop at a different site or abandon on-line purchasing altogether. For B2B exchanges, millions of dollars of goods and materials can be hung up several days due to a minor error. And given that many companies operate on a just-in-time inventory scheme, a delay in the shipment of millions of dollars of parts can dramatically effect their manufacturing process and overall profitability.

In an effort to minimize the damage caused by transaction failures, many B2C businesses and B2B exchanges have established call centers. These call centers are staffed with people whose task is to handle incoming calls from customers or purchasers with complaints. Generally, if a customer is dissatisfied with their on-line transaction, they can call a toll free number to speak with a human operator who helps remediate any problems with a customer's on-line transaction which may have occurred. The primary role of call centers today is to handle inbound calls that originate from disgruntled customers who dial in to the call center through a pre-defined phone number.

Although call centers do help ameliorate problems to a certain degree, they suffer several major deficiencies. Namely, the damage has already been done because the customer is already dissatisfied with the failed transaction. Furthermore, a customer may be put on hold or receive a busy signal and cannot even get through to the call center. This aggravates the customer's level of frustration even more so. In addition, a customer can, at best, be only identified via their phone number or a customer identification number after a database lookup. Consequently, the call center representative has little or no knowledge about the customer, the transaction at issue, or the reason(s) for their call. It is up to the customer then to explain their problem to the call center representative. Often, the call center representative cannot address the problem right away and must research the problem and call the customer back at a later time. Sometimes, the call center representative must obtain authorization from a manager before they are able to take the steps necessary to fix the problem.

Thus, there is a need in the prior art for improvements in existing call center technology for handling B2C and B2B markets. The present invention provides a unique, novel solution which overcomes the shortcomings of today's call centers.

SUMMARY OF THE INVENTION

The present invention pertains to a proactive call center which detects problems, resolves the problems, and then contacts the customers before customers initiate calls themselves. In the present invention, when an order is accepted, a workflow process is initiated to fill that order. The workflow process is monitored to ensure that the transaction is completed without problems. If a problem does occur, a call center agent is notified of the problem. The call center agent can then take immediate steps to research the problem, fix the problem, or otherwise find alternative solutions to help ameliorate the problem. The call center agent then proactively contacts the customer to explain the problem and what steps were taken to address the problem. By proactively taking steps to address problems as they occur rather than in response to customer complaints, businesses can maintain or even promote goodwill.

In one embodiment of the present invention, the proactive call center technology is used by a service provider to help place sales. In this embodiment, a customer is first presented with products which are offered for sale. If the customer does not find any products currently being offered that meet their approval, the customer is presented with a set of customer selectable conditions relating to products in that market. The customer then chooses the particular conditions they desire. The customer's set of desired conditions are stored in a database. The database is routinely monitored to determine whether any of those conditions can be met. If at some future point, the set of user selected conditions can be met, a call center agent immediately contacts the potential customer and offers that product which meets those conditions set by the customer. The customer can then accept the offer to consummate the deal.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A system and method for a proactive call and contact center is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
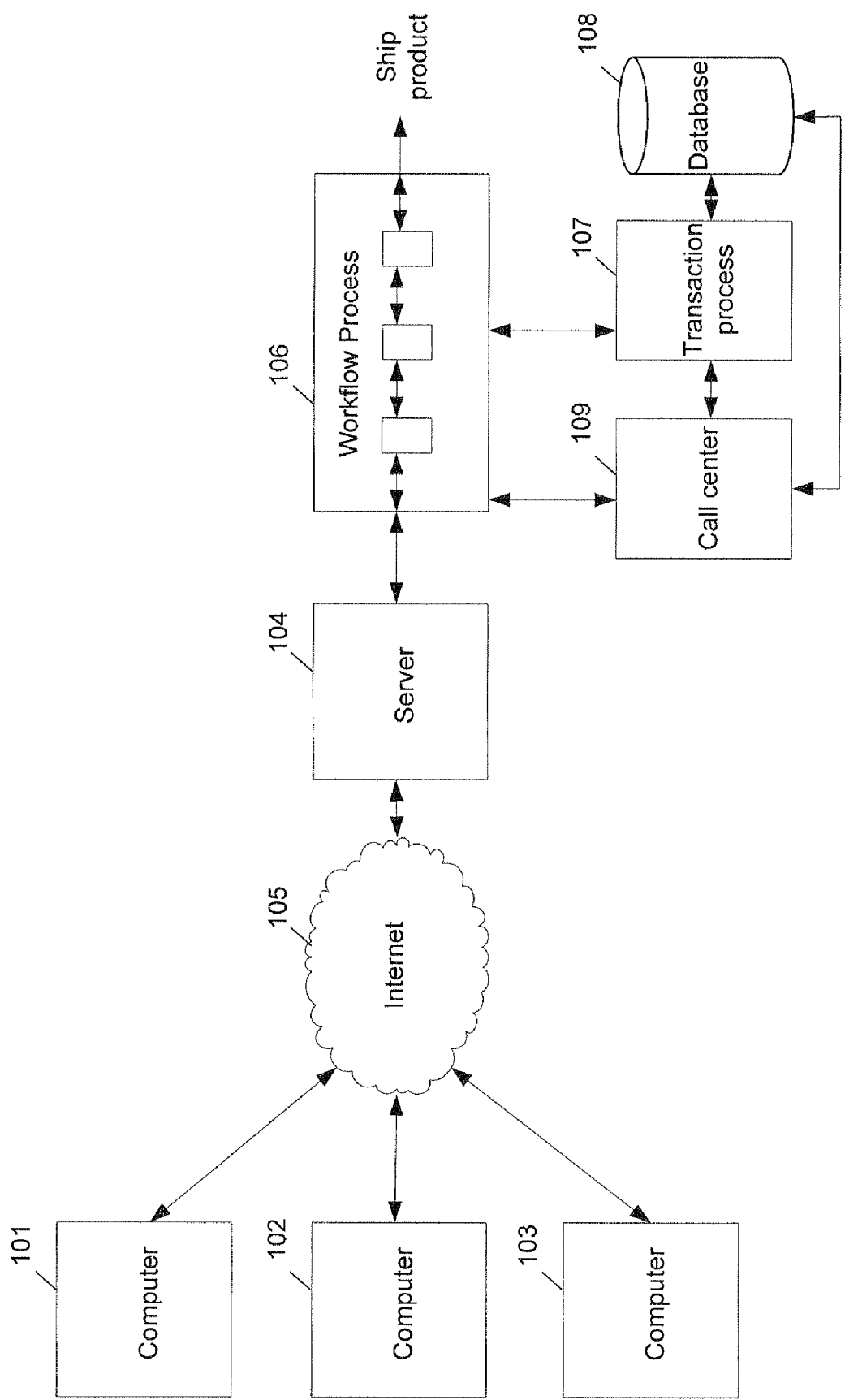
FIG. 1 shows a system upon which the present invention of a proactive call center may be implemented in a B2C business environment.

FIG. 1 shows a system upon which the present invention of a proactive call center may be implemented in a B2C business environment. Any number of customers 101-103 can use their browsers to access a company's web site located on a server 104 via the internet 105. The web site has one or more HTML web pages for displaying products, pricing, availability, quantity, date, and other relevant information. A customer may then point-and-click to select a product for purchase and then enter their credit card number for payment. Upon receipt of the order, the company's server initiates a work flow process 106 to fill that order. The work flow process can include functions such as demand planning, requisition, approval, receipt, distribution, accounts receivable, measurement, forecasting, inventory control, shipping, etc. This workflow process 106 may even bring in deliverables and/or services from third parties. The workflow process communicates with the transaction process to execute all the incoming transactions. All relevant information pertaining to each of the individual transactions are stored in a database 108. If everything proceeds smoothly, the product eventually ships to the customer.

However, there may be a transaction which cannot be completed for some reason (e.g., network failure, parts shortage, rejection of offer, software glitch, etc.). For any condition which may cause the transaction to fail, the call center 109 is automatically notified. At that point, a call center representative can access the workflow process 106, transaction process 107, and database 108 to proactively research the problem and take steps to fix the problem. The call center representative can then proactively contact (via a telephone call, email, or fax) the customer to explain the situation and propose a solution or some other viable alternatives. For example, a call center representative could offer a similar but different product, ask whether customer could wait for the order to be filled, offer a rebate or discount, propose different terms and conditions, ask for different form of payment, etc. With the present invention, call center representatives can resolve problems and provide various options to customers before customers are even aware that they have a problem and before customers call into the call center to lodge their complaints.

Figure 2:
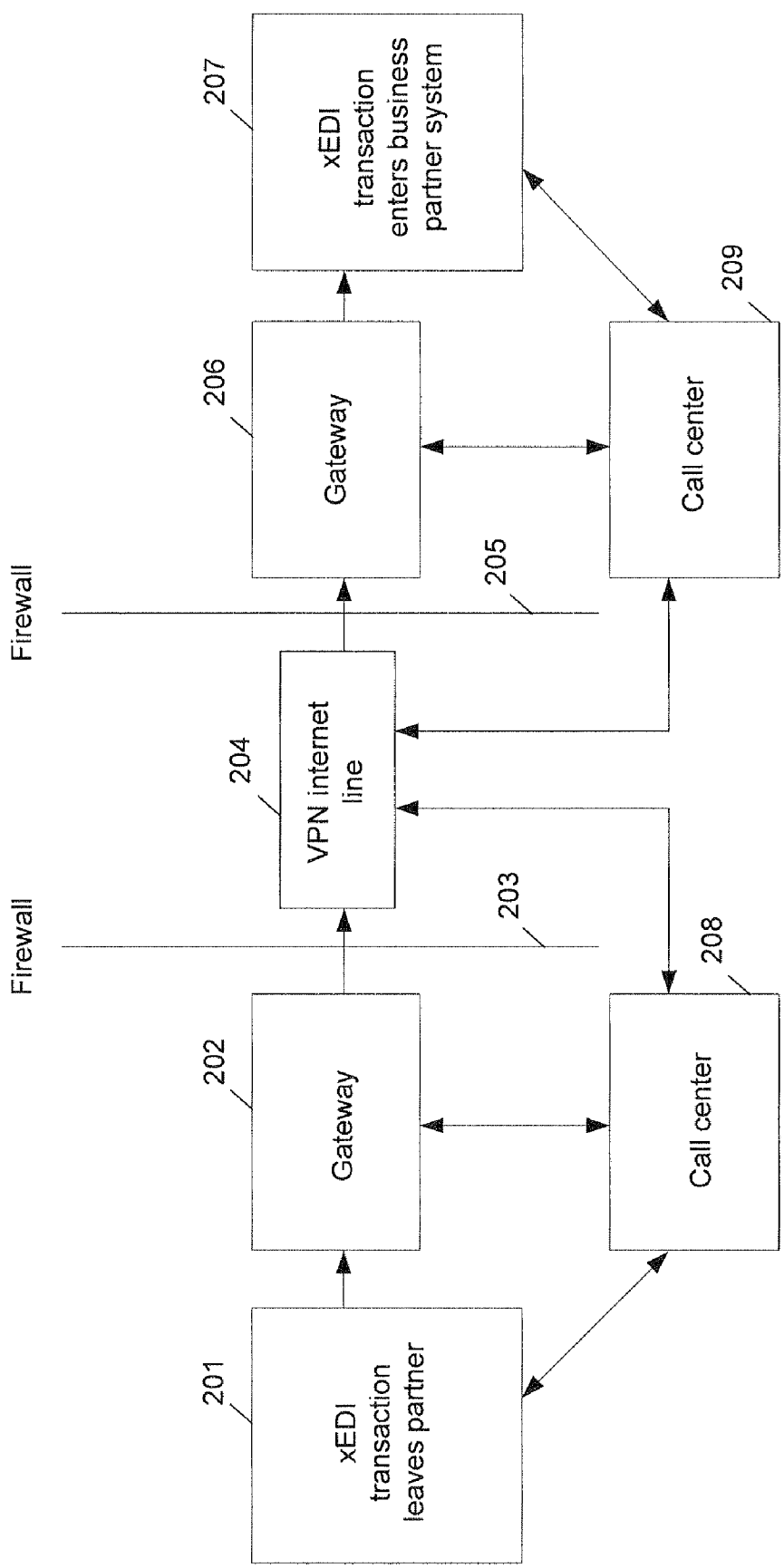
FIG. 2 shows a system upon which the present invention of a proactive call center may be implemented in a B2B business environment.

FIG. 2 shows a system upon which the present invention of a proactive call center may be implemented in a B2B business environment. The electronic data interchange (EDI) transactions leave the partner's system 201 via a gateway 202 and pass through the partner's firewall 203. The EDI transactions are routed through the VPN Internet line or a private lease line 204 and are eventually received by the other business partner's system 207 after passing through firewall 205 and gateway 206. Proactive call center 208 on the sending partner's side is used in resolving error exceptions which may arise from blocks 201-204. Similarly, the same or a different proactive call center 209 is used in resolving error exceptions which may arise from blocks 204-207. Thereby, the proactive call center technology of the present invention can be applied to traditional procurement transactions between known partners with established business processes in a B2B exchange model.

In the present invention, call centers are integrated as part of the standard business process workflow. The workflow program can automatically trigger a call center in real time to alert a call center representative of any potential failures. Thereby, real time communications can be conducted during the workflow. For example, phone find and seek followed by a collaboration session could all be triggered from within a workflow environment via the call centers. One example of how this may be implemented is described in the patent application entitled, "Multimedia B2B Opportunity And Error Detection And Resolution Engine," filed Nov. 30, 2000, Ser. No. 09/727,841. More specifically, the present invention integrates any business process flow with the queuing and servicing of calls in a call center. By integrating open standard hooks based upon Java or some other open standard communication technology protocol (e.g., Corba, CDOM, etc.), business transaction workflow processes—either time out, or declination of acceptance, or other required human intervention that may be a standard part of a process (e.g., an auction bid counter offer), will launch communication messages into the queue of an existing call center. Such information will contain the specific transaction information and user information. Call center representatives can then research such problems and easily contact individuals with or without such individuals aware of an impending call, thereby resulting in a proactive contact by the call center. It should be noted that individuals, organizations, exchanges, and businesses may have a myriad number of transactions at any one time in a business program, because the opportunities come from a workflow paradigm; the owner and organization are known. Therefore, outbound contact is easily accomplished. The service center may resolve the situation or provide various options to customers before they call out to their customer to resolve a problem and before a customer calls in to report the problem.

In the currently preferred embodiment, workflow adapter connectors are used to integrate communication technology functionality into the workflow procurement process. Actions that are performed by a call center, such as an Intelligent Contact Manager, can be coded into the workflow program. An ICM, as may be utilized in the present invention, is described in U.S. Pat. No. 5,878,130, "Communications System And Method For Operating Same"; U.S. Pat. No. 5,848,143 "Communications System Using A Central Controller To Control At Least One Network And Agent System"; and U.S. Pat. No. 5,546,452 "Communications System Using A Central Controller To Control At Least One Network And Agent System" which are incorporated by their entirety herein. In addition, a web collaboration center (e.g., Collaboration Server), and a search and find process can be coded into a workflow program and triggered automatically within a business transaction and therefore become a call center events in an eCommerce process or traditional procurement workflow process. Similarly, human communication can be the event. The human call center representative can be prompted or triggered from within the workflow between the buyer and supplier or participating parties with or without the call center being involved. This means that human collaboration between buyer and seller is now made possible.

As an example, one workflow integration adapter will trigger a search for an individual and provide a voiced email message, email, or connect through to a call center agent that will have a screen popup indicating what problem or opportunity the person sought should resolve. This function allows for additional persons (available from an LDAP list) to be sought in the event the person is not there. The option to leave a message before going to seek another person is available. Thereby, another person will know that the system would attempt to locate their peers for an urgent situation. In the same process, two individuals could be sought in parallel with or without a service agent involvement. In the case with a call center agent, the first person may be sought and found, and decide after hearing a message that they would like to talk to the related party that is involved in the transaction. Thereafter, by pushing a button, they could be connected to the other party (note that this does not involve the use of a call center) and discuss the problem that was brought to the first party's attention by the automated message or by the call agent.

Another adapter will trigger either the customer help desk or procurement opportunity business group agent to call a customer to resolve a problem. Therefore, the trigger will end up as queued activity with specific priorities with the traditional call center. This situation may require research before a call is made in order to provide the customer the opportunity to choose or select a direction to resolve a situation. Such an outbound call is not to be confused with the "predictive dialing," ubiquitous outbound dialing process that is performing the function of telemarketing.

In one embodiment, the present invention calls for the definition of contact method, by value or transaction through a customer defined arbitrary criteria made available with the workflow engine or external database. The authorization level will be inserted to determine the queue priority or method of contact. Such a list can be located in a database and can, when queried, allow the workflow program to direct the type of communication as accorded by the workflow connectors. For example, this adapter can produce such a trigger if a problem or time out event occurs in a workflow process. Additionally, the contact or call center is able to then trigger the unified communications system to locate a representative of the firm for whom the situation is relevant (either manually or automatically). This is done automatically for a call center agent that is free, assuming there is the prioritization between incoming calls to a call center and outgoing problem resolution.

In the currently preferred embodiment, the architecture of the present invention is formulated in such a manner as to allow icons to be dropped into several of the more important workflow programs that are utilized by numerous business applications and other workflow programs that may not be business transaction oriented. The icons represent triggers for script in the communications environment. It should be noted that communication is not limited to call center agent intervention. If agent intervention is not required, simple messages can be sent to a customer mailbox as a voice message or an email message. A computer generated voice message can be heard by the participant if they answer or such a voice message can be left on a customer or participant's answering machine.

Figure 3:
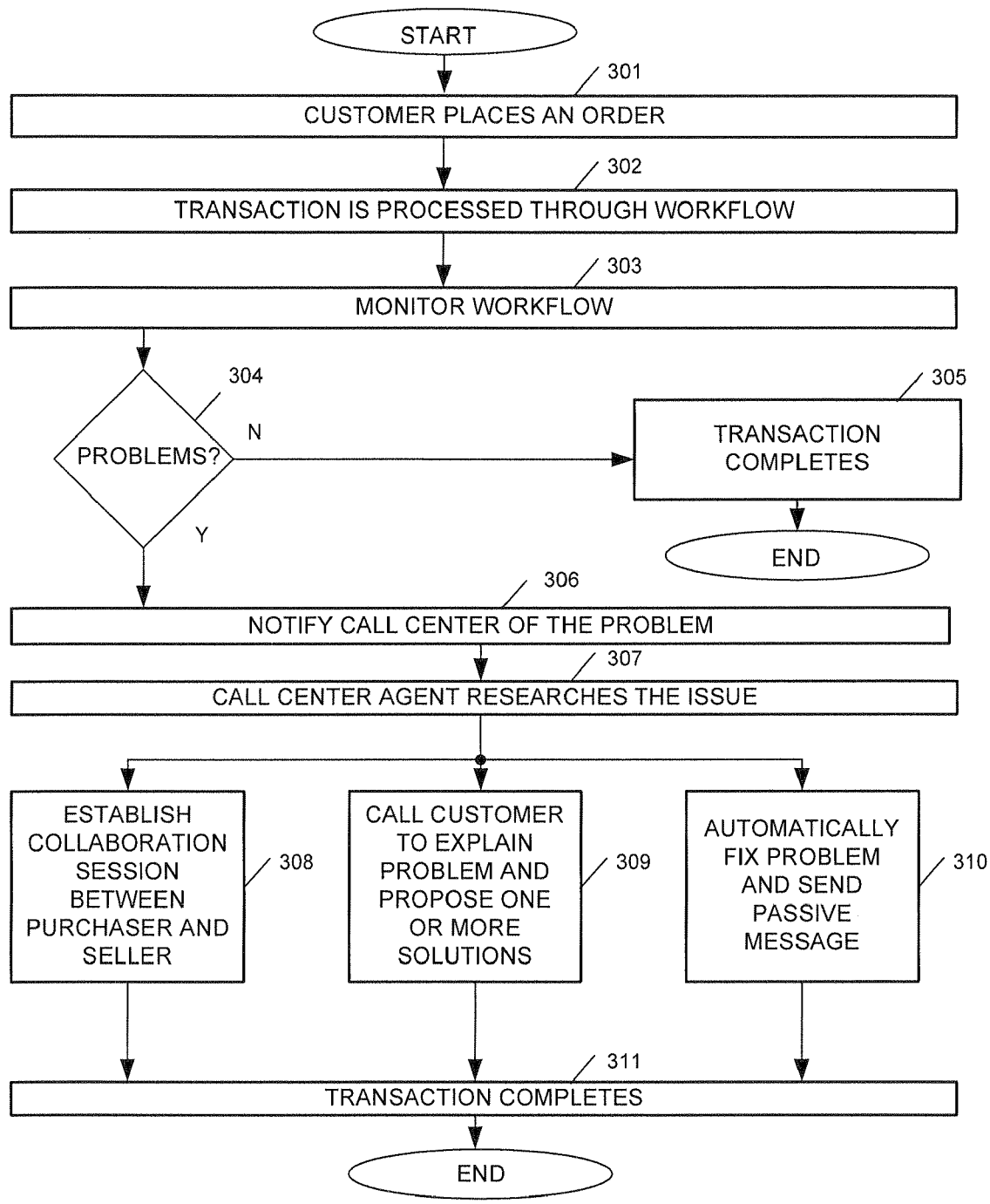
FIG. 3 is a flowchart describing the steps for performing a proactive call center process.

FIG. 3 is a flowchart describing the steps for performing a proactive call center process. Initially, a customer places an order, step 301. This can be accomplished by dialing into a toll free number, clicking on a web site, or any other traditional method of ordering. The transaction is then processed through the seller's normal workflow process, step 302. This workflow process is monitored from start to finish by agents to detect any failure conditions which may arise, step 303. If there are no failures detected by step 304, the product ships, payment is received, and that transaction completes, step 305. Otherwise, if a problem is detected in step 304, the call center is immediately notified, step 306. A call center agent researches the problem, step 307. The call center agent can be a piece of intelligent software or a human. The call center agent queries the workflow process to determine what triggered the failure. Dependent upon what the problem was, the call center agent is presented with a number of different options for resolving the problem. One option is to establish a collaboration session between the purchaser and the seller, step 308. The collaboration session can be web based, teleconferenced, or through telephone. Another option is to notify the customer of the problem and propose solutions, step 309. This can be accomplished by a human representative calling the customer or by a software agent transmitting an email or fax to the customer. Another option is to automatically fix the problem and transmitting a confirmation to the purchaser and/or seller that there was a problem and that the problem has now been fixed, step 310. In all three cases, it should be noted that the call center proactively address the problem before the customer lodges a complaint. Once the problem is suitably addressed, the transaction proceeds to completion, step 311.

In another embodiment of the present invention, the proactive call center technology can be used to provide a participant of an organization the ability to set transactional notification conditions on the sales side. The proactive call center serves as a proactive service provider. A customer can invoke a web page to set the conditions upon which they would like to be contacted from a call center agent regarding the availability, price, or other product feature. The conditions for contact would be set based on the information that is dynamically changing within a database either owned by the participant or the organization.

Once the customer defined business conditions are met, a trigger message is sent into the queue of the call center. Similar to the embodiment described above relating to the workflow triggered contact center queued messaging, a message to contact the participant can be queued into the call center queue to call the participant. It should be noted that this is distinctly different from other market dial outbound features in that this call is initiated on behalf of the user or participant and therefore an opportunity that the participant desires to have the option to act or pass upon that opportunity.

Figure 4:
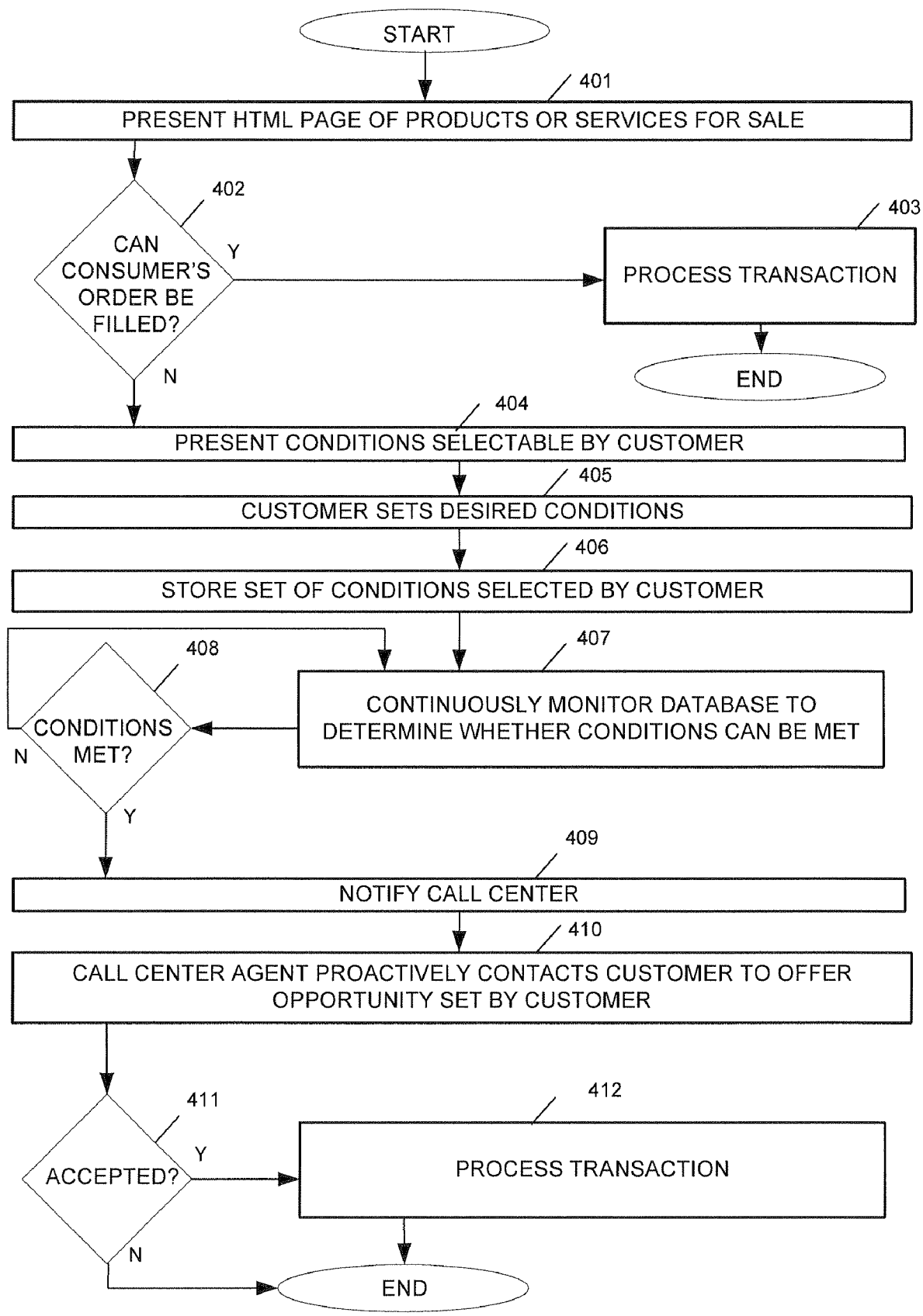
FIG. 4 is a flowchart describing the steps pertaining to the proactive service provider process.

FIG. 4 is a flowchart describing the steps pertaining to the proactive service provider process. In step 401, a company provides a web site comprising a number of HTML web pages which potential customers can browse on-line. Upon viewing the products and services offered on the web site, the customer can make a determination as to whether the desired product or service is available for immediate purchase, step 402. If the customer's order can be filled, then that transaction is immediately processed, step 403. Otherwise, if the customer's desired products or services are unavailable at that time, a set of selectable conditions are presented to the customer, step 404. These conditions can relate to certain features, pricing, models, functions, sizes, colors, ship dates, warranties, and other relevant information pertaining to a product or service. The customers sets the conditions that he or she desires, step 405. This set of conditions selected by the potential customer is stored in a database, step 406. The database is routinely and continuously monitored to determine whether that customer's conditions can be met, step 407.

If at some time, the conditions as selected by the customer can be met, a notification is sent to the call center, step 409. Thereupon, the call center agent can contact the customer to offer the product or service which that customer had indicated he or she wished to purchase, step 410. The call center agent can be a human representative who makes a telephone call to the customer, or the call center agent can be a piece of software which automatically generates and transmits an email or fax to the potential customer. The customer is contacted and presented with an offer which matches the conditions that they had previously set as being desired. At that point, the customer can review the offer and based thereon, either accept or decline the offer, step 411. If the offer is accepted, the workflow to process the transaction is initiated, step 412. Otherwise, the offer is rejected and the database is updated by removing the set of conditions because the customer no longer desires that product or service. Thereby, this embodiment provides passive opportunities to be provided to users proactively and through the traditional call center, which does not provide such functionality. Given the workflow and call center integration, transactional business resolutions can now be handled in a proactive manner by call center technology.

An example is now presented to show how the proactive service provider functions. Suppose that a potential car buyer searches a dealer's web site to peruse new cars. After reviewing car prices, the potential car buyer may realize that the new models are beyond what he can afford to pay. The customer can then peruse the used car selections which are currently available. If the customer does not find any used cars which meets his criteria, he may then go to the web page which prompts him to enter in the conditions that the car buyer is looking for. The customer can enter in the dollar amount, features, mileage, color, the make and model that the customer desires. This information is stored in a database maintained by the auto dealership. If the dealership comes into possession (e.g., a trade-in) of a car which matches all or most of the conditions set by that potential car buyer becomes available, a sales person is notified. The sales person can then proactively contact the potential car buyer to negotiate a deal.

Business or market exchanges will need to understand their customers needs and their suppliers offerings in order to proactively inform their customers in a timely manner of opportunities that exist. A predictive dialing feature is utilized for state management triggers within exchanges. The solution allows for the monitoring of pricing levels with automated Intelligent Contact Manager (ICM) engagement and linked search and find functionality. For example, an ICM is capable of handling the requirements of an automated auction or sale of perishable goods.

In order to accomplish this feature, the solution has the programmed logic that intermittently checks the database of the exchange for available inventory, service against the profile set up for particular exchange customers or specific requests for checking on a one time basis. In one embodiment, the technology to accomplish this is embedded in the workflow process or supplied by a business intelligence vendor. Once conditions are met, a message can be sent via email, voiced message, or contacted directly by exchange service agent by phone to the party to be notified. The person who requested to be notified receives the notification (e.g., a customer may request that if any XYZ chips become available to let me know at once since my allocation is relatively small).

Furthermore, exchange service agents may be prompted manually from the workflow and then choose to locate the specific party using the search and find solution as described in the patent application entitled, "Multimedia B2B Opportunity And Error Detection And Resolution Engine," filed Nov. 30, 2000, Ser. No. 09/727,841, to locate the authorized parties. The requirements for such opportunities are, in this case, to be set by the customer. However, it is contemplated that such a feature could be utilized by Call Centers in businesses other that B2B for e-marketing. As such, the scope of this invention extends beyond just the B2B and on-line markets. With the present invention, the B2B business partners have a mechanism by which to respond to automated marketing sales opportunities in response to new unrequested prompts of opportunities. This key strategic intervention from a service agent is ideally suited to the B2B environment.

Figure 5:
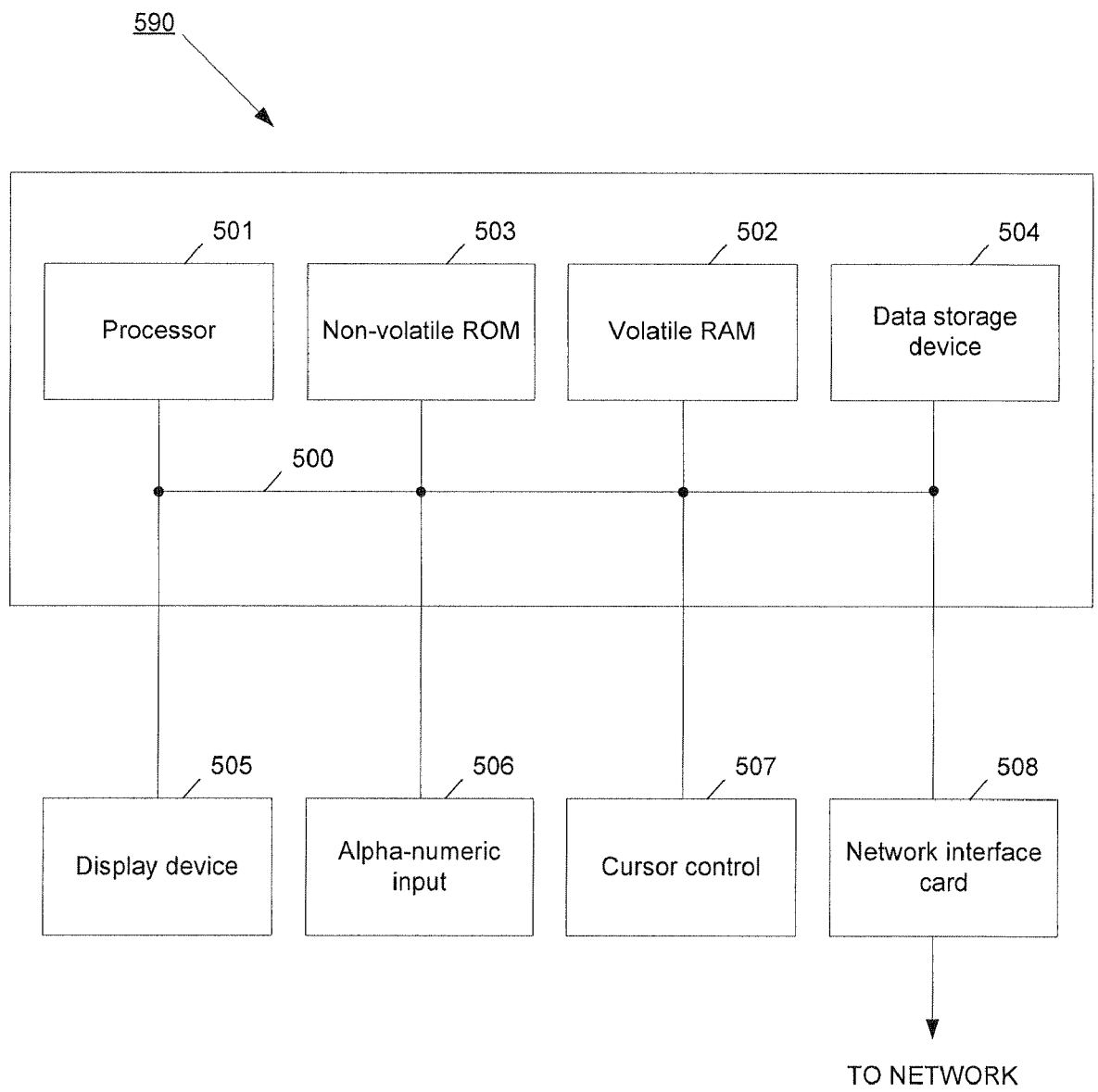
FIG. 5 shows an exemplary computer system upon which embodiments of the present invention may be practiced.

Referring now to FIG. 5, an exemplary computer system 590 upon which embodiments of the present invention may be practiced is shown. In general, computer system 590 comprises bus 500 for communicating information, processor 501 coupled with bus 500 for processing information and instructions, random access (volatile) memory 502 coupled with bus 500 for storing information and instructions for processor 501, read-only (non-volatile) memory 503 coupled with bus 500 for storing static information and instructions for processor 501, data storage device 504 such as a magnetic or optical disk and disk drive coupled with bus 500 for storing information and instructions, an optional user output device such as display device 505 coupled to bus 500 for displaying information to the computer user, an optional user input device such as alphanumeric input device 506 including alphanumeric and function keys coupled to bus 500 for communicating information and command selections to processor 501, and an optional user input device such as cursor control device 507 coupled to bus 500 for communicating user input information and command selections to processor 501. Furthermore, a network interface card (NIC) 508 is used to couple computer system 590 onto, for example, a client-server computer system network. In such a network, computer system 590 can exemplify a client computer system and/or a server computer system.

Display device 505 utilized with computer system 590 may be a liquid crystal device, cathode ray tube, or other display device suitable for creating graphic images and alphanumeric characters recognizable to the user. Cursor control device 507 allows the computer user to dynamically signal the two-dimensional movement of a visible symbol (pointer) on a display screen of display device 505. Many implementations of the cursor control device are known in the art including a trackball, mouse, joystick or special keys on alphanumeric input device 506 capable of signaling movement of a given direction or manner of displacement. It is to be appreciated that the cursor control 507 also may be directed and/or activated via input from the keyboard using special keys and key sequence commands. Alternatively, the cursor may be directed and/or activated via input from a number of specially adapted cursor directing devices.

Thus, a proactive call and contact center system is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus comprising:
   one or more processors; and
   a memory coupled to the processors comprising instructions executable by the processors, the processors operable when executing the instructions to:
   monitor a workflow process to detect one or more exceptions that disrupt completion of one or more purchasing transactions between transactional parties;
   determine whether the detected exceptions correspond to a first type, a second type or a third type according to characteristics of the detected exceptions;
   when the detected exceptions correspond to the first type, automatically resolve the disruption without communicating with the transactional parties;
   when the detected exceptions correspond to the second type, cause an outbound communication to be sent to a purchasing one of the transactional parties proactively and independently of whether the purchasing transactional party has reported the disruption, the outbound communication indicating a plurality of selectable proposed solutions to the detected exceptions; and
   when the detected exceptions correspond to the third type, establish a real time collaboration session between the transactional parties proactively and independently of whether the transactional parties have reported the disruption.

2. The apparatus of claim 1 wherein the processors are further operable to:
   access a database to determine an authorization level associated with the disrupted purchasing transactions when the detected exceptions correspond to the second type;
   identify a queue used by representatives of a call center, the queue listing entries for other exceptions to be resolved by the call center; and
   compare the determined authorization level to the entries in the queue to determine a relative position in the queue for inserting a new entry that includes instructions for performing the outbound communication, background information corresponding to the disrupted purchasing transactions and contact information for the purchasing transactional party.

3. The apparatus of claim 1 wherein the processors are further operable to cause a software agent to send the outbound communication proactively and independently of whether the purchasing transactional party has reported the disruption.

4. The apparatus of claim 1 wherein the processors are further operable to:
   format a list of call center representatives identified in a Lightweight Directory Access Protocol (LDAP) directory;
   rank the formatted list according to an analysis of the detected exceptions; and
   select a target one of the call center representatives to initiate the outbound communication, the selection occurring according to both the ranking and different availability status indications for the call center representatives.

5. The apparatus of claim 1 wherein the processors are further operable to select a medium to be used for transfer of the outbound communication according to characteristics of the disrupted purchasing transaction.

6. The apparatus of claim 1 wherein the processors are further operable to send one or more signals to an endpoint associated with a selected call center representative, the signals causing establishment of an interactive communication session between the selected call center representative responsive to activation of a single button associated with the selected call center representative.

7. The apparatus of claim 1 wherein the characteristics include whether the detected exceptions correspond to network failures, parts shortage, offer rejection and software malfunctions.

8. The apparatus of claim 7 wherein the apparatus is further operable to determine that the detected exceptions correspond to the first type when an analysis indicates that the detected exceptions are caused by network failures or software malfunctions.

9. The apparatus of claim 8 wherein the processors are further operable to determine that the detected exceptions correspond to the second type when an analysis indicates that the detected exceptions are caused by parts shortage.

10. The apparatus of claim 9 wherein the processors are further operable to determine that the detected exceptions correspond to the third type when an analysis indicates that the detected exceptions are caused by offer rejections.

11. A system comprising:
    means for detecting one or more exceptions that disrupt completion of one or more purchasing transactions between transactional parties;
    means for automatically determining whether resolution of the detected exceptions requires a query response from one or both the transactional parties;
    means for triggering establishment of a communication session with one or both of the parties when the resolution requires the query response, the communication session initiated remotely with respect to one or more endpoints corresponding to a purchasing one of the transactional parties and initiated proactively and independently of whether the purchasing transactional party has reported the disruption; and
    means for resolving the detected exceptions according to the query response received over the communication session.

12. The system of claim 11 further comprising:
    means for providing product configuration web pages, the web pages presenting different selectable conditions relating to product ordering and including at least a price selection, a feature selection and a ship date selection;
    means for identifying a combination of selected conditions originating from the endpoints that correspond to the purchasing transactional party and specifying a proposed product that is unavailable for final transaction at a time that the combination is identified;
    means for regularly and continuously comparing the identified combination that represents the proposed product to a database indicating available inventory; and
    means for initiating the purchasing transactions remotely with respect to the endpoints associated with the purchasing transactional party.

13. The system of claim 11 further comprising means for sending a computer generated voice message to the purchasing transactional party to elicit the query response.

14. The system of claim 11 further comprising means for automatically resolving the detected exceptions without triggering the communication session when the detected exceptions do not require the query response.

15. The system of claim 11, wherein the purchasing transactions are initiated using one or more web pages.

16. The system of claim 11, wherein the system is coupled to a Business to Business (B2B) exchange.

17. A method comprising:
  detecting one or more exceptions that disrupt completion of one or more purchasing transactions between transactional parties;
  determining whether the detected exceptions correspond to a first type, a second different type or a third different type;
  when the detected exceptions correspond to the first type, automatically resolving the disruption without querying the transactional parties;
  when the detected exceptions correspond to the second type, causing an outbound querying communication to be sent to a purchasing one of the transactional parties proactively and independently of whether the purchasing transactional party has reported the disruption, the outbound querying communication indicating a plurality of selectable proposed solutions to the detected exceptions; and
  when the detected exceptions correspond to the third type, establishing a real time collaboration session between the transactional parties proactively and independently of whether the transactional parties have reported the disruption.

18. The method of claim 17 wherein the outbound querying communication is sent manually.

19. The method of claim 17 further wherein the outbound querying communication is sent automatically without involving a call center representative.

20. The method of claim 17 further comprising initiating a web-based real time interaction session between the transactional parties when the detected exceptions correspond to the second type and proactively and independently of whether the transactional parties have reported the disruption.

21. A proactive call center system comprising:
  an interface configured to receive an order for delivery of a product placed by a customer on-line;
  a server configured to execute a workflow process and coupled to the interface, the server that further configured to execute the order for delivering the product to the customer;
  logic circuitry coupled to the server and configured to monitor the workflow process to detect any problems that disrupt delivery of the order;
  a communications device coupled to the logic circuitry and configured to send a notification to which notifies a human call center agent responsive to the logic circuitry detecting the problems and proactively and independently of whether the customer has reported the problems, the notification including contact information for the customer; and
  a call center coupled to the communications device and configured for use by a human call center agent to proactively establish a telephonic interaction with the customer responsive to the notification.

22. The proactive call center system of claim 21, further comprising memory storing triggering software operable to automatically establish a telephonic connection between the customer and the human call center agent responsive to an acknowledgement of the notification by the human call center agent.

23. The proactive call center system of claim 21, further comprising a software application displaying an icon to be selected by the human call center agent for sending the acknowledgement.

24. The proactive call center of claim 21 further comprising a telephone endpoint including circuitry configured to send the acknowledgement to the call center responsive to the human call center agent activating a single button or other switch located at an endpoint associated with the human call center agent.

* * * * *

UNITED STATES PATENT AND TRADEMARK OFFICE
CERTIFICATE OF CORRECTION

| | | |
|---|---|---|
| PATENT NO. | : 7,343,406 B1 | |
| APPLICATION NO. | : 09/766175 | |
| DATED | : March 11, 2008 | |
| INVENTOR(S) | : Buonanno et al. | |

It is certified that error appears in the above-identified patent and that said Letters Patent is hereby corrected as shown below:

On the Title Page, Item (75) Inventors, please replace "Chris Shenefiel" with --Chris Shenefield--.
At column 12, line 8, please replace "server that further" with --server further--.
At column 12, line 15, please replace "notification to which notifies" with --notification to--.

Signed and Sealed this

Sixteenth Day of June, 2009

JOHN DOLL
*Acting Director of the United States Patent and Trademark Office*